US008509406B2

(12) United States Patent
Mueller et al.

(10) Patent No.: US 8,509,406 B2
(45) Date of Patent: Aug. 13, 2013

(54) PRESENCE ENHANCED TELEPHONY SERVICE ARCHITECTURE

(75) Inventors: Stephen Mark Mueller, Austin, TX (US); Alicia Marie Russell, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 12/638,343

(22) Filed: Dec. 15, 2009

(65) Prior Publication Data

US 2010/0166162 A1  Jul. 1, 2010

Related U.S. Application Data

(63) Continuation of application No. 10/628,248, filed on Jul. 29, 2003, now Pat. No. 7,660,898.

(51) Int. Cl.
H04M 1/56  (2006.01)

(52) U.S. Cl.
USPC .................. 379/142.06; 379/207.15

(58) Field of Classification Search
USPC .... 379/88.22–88.25, 211.03, 142.01–142.07, 379/207.15
See application file for complete search history.

(56) References Cited

U.S. PATENT DOCUMENTS

| | | | | |
|---|---|---|---|---|
| 5,473,671 A * | 12/1995 | Partridge, III | ................ | 455/445 |
| 5,872,840 A * | 2/1999 | Wu | ................ | 379/197 |
| 6,233,332 B1 * | 5/2001 | Anderson et al. | ........ | 379/265.09 |
| 6,665,396 B1 | 12/2003 | Khouri et al. | | |
| 6,678,366 B1 * | 1/2004 | Burger et al. | ............ | 379/211.03 |
| 6,792,094 B1 * | 9/2004 | Kirkpatrick | .............. | 379/209.01 |
| 6,870,848 B1 | 3/2005 | Prokop | | |
| 6,959,182 B2 | 10/2005 | Lingafeldt et al. | | |
| 7,123,707 B1 | 10/2006 | Hiri et al. | | |
| 7,143,182 B1 * | 11/2006 | Gits et al. | ...................... | 709/238 |
| 7,162,237 B1 * | 1/2007 | Silver et al. | ................ | 455/432.3 |
| 7,162,474 B1 | 1/2007 | Harker et al. | | |
| 7,463,619 B1 * | 12/2008 | Prokop et al. | ................. | 370/352 |
| 7,606,859 B2 * | 10/2009 | Shiga et al. | ................... | 709/204 |
| 2002/0083127 A1 | 6/2002 | Agrawal | | |
| 2002/0114441 A1 | 8/2002 | Coussement | | |
| 2002/0115447 A1 | 8/2002 | Martin et al. | | |
| 2002/0126701 A1 | 9/2002 | Requena | | |
| 2002/0131395 A1 | 9/2002 | Wang | | |

(Continued)

OTHER PUBLICATIONS

Rosenberg, J., "Dynamicsoft: SIP and MMS", <www.dynamicsoft.com/news/presentations/SIP-2003_SIP_and_MMS.pdf>(2003).

(Continued)

Primary Examiner — Simon Sing
(74) Attorney, Agent, or Firm — Greenblum & Bernstein, P.L.C.

(57) ABSTRACT

A method for integrating presence services into a telecommunications system that includes a presence server. The method includes receiving a query, by the presence server from service logic, the query including call parameters and call information, regarding a call from a session initiator to a session terminator. The method also includes comparing, by the presence server, the call parameters and the call information with a stored presence profile established for the session terminator, the stored presence profile including preferred treatment information. The method further includes collecting usage information of the session terminator, and automatically generating the preferred treatment information, when the preferred treatment information has not been established. The method then determines a treatment of the call, by the presence server, based upon the stored presence profile and the preferred treatment information.

20 Claims, 7 Drawing Sheets

(56) References Cited

U.S. PATENT DOCUMENTS

| | | |
|---|---|---|
| 2002/0146097 A1 | 10/2002 | Vuori |
| 2002/0196923 A1 | 12/2002 | Donnelly |
| 2003/0065788 A1 | 4/2003 | Salomaki |
| 2003/0073440 A1 | 4/2003 | Mukherjee et al. |
| 2003/0135569 A1* | 7/2003 | Khakoo et al. ............... 709/206 |
| 2003/0174814 A1* | 9/2003 | Diacakis ........................ 379/80 |
| 2003/0215078 A1* | 11/2003 | Brahm et al. ............ 379/211.02 |
| 2004/0078468 A1 | 4/2004 | Hedin et al. |
| 2004/0083291 A1 | 4/2004 | Pessi et al. |
| 2004/0131042 A1 | 7/2004 | Lillie et al. |
| 2004/0133683 A1 | 7/2004 | Keller et al. |
| 2004/0170263 A1 | 9/2004 | Michael et al. |
| 2004/0177134 A1 | 9/2004 | Lonnfors et al. |
| 2004/0180646 A1 | 9/2004 | Donley et al. |
| 2004/0203644 A1 | 10/2004 | Anders et al. |
| 2004/0203664 A1 | 10/2004 | Lei et al. |
| 2005/0027867 A1 | 2/2005 | Mueller et al. |
| 2007/0123284 A1 | 5/2007 | Schliwa-Bertling et al. |

OTHER PUBLICATIONS

Peterson, J., "Enumservice Registration for Presence Services", Internet Draft, The Internet Society (Feb. 24, 2003).

Faltstrom, P., "The E.164 to URI DDDS Application (ENUM)", Internet Draft, The Internet Society (Apr. 8, 2003).

* cited by examiner

PRESENCE ENHANCED TELEPHONY SERVICE ARCHITECTURE

CROSS REFERENCE TO RELATED APPLICATIONS

This is a continuation application of pending U.S. patent application Ser. No. 10/628,248, filed Jul. 29, 2003, which issued as U.S. Pat. No. 7,660,898 on Feb. 9, 2010, the content of which is expressly incorporated by reference herein in its entirety.

BACKGROUND OF THE INVENTION

1. Field of the Invention

The present invention relates to the field of telecommunications. More particularly, the present invention relates to implementing presence in a telecommunications network.

2. Background Information

Internet based instant messaging services have recently gained popularity. Popular commercial instant messaging services contain a presence component, meaning that they maintain an active and dynamic record of the availability and status of their subscribers. The presence of a subscriber typically indicates whether this subscriber is online and available to participate in communications sessions with other subscribers. When compared to traditional telephony, instant messaging with presence provides several advantages. First, the session initiating party knows the status of the session terminating party or parties in advance. Second, the recipient may affect the presence status by indicating to the system an unwillingness to communicate with certain or all parties.

Presence information has been expanded beyond the limited 'login status' to include other types of information, such as geographical location, device identity and capabilities, network address at which the subscriber is available, preferred mode of communication, etc. Industry forums (such as the Open Mobile Alliance (OMA), Internet Engineering Taskforce (IETF), and Presence and Availability Management (PAM) forum) have provided specifications on the interworking, functionality, and interfaces of presence systems.

It would be desirable to extend the application of presence beyond instant messaging to telephony.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
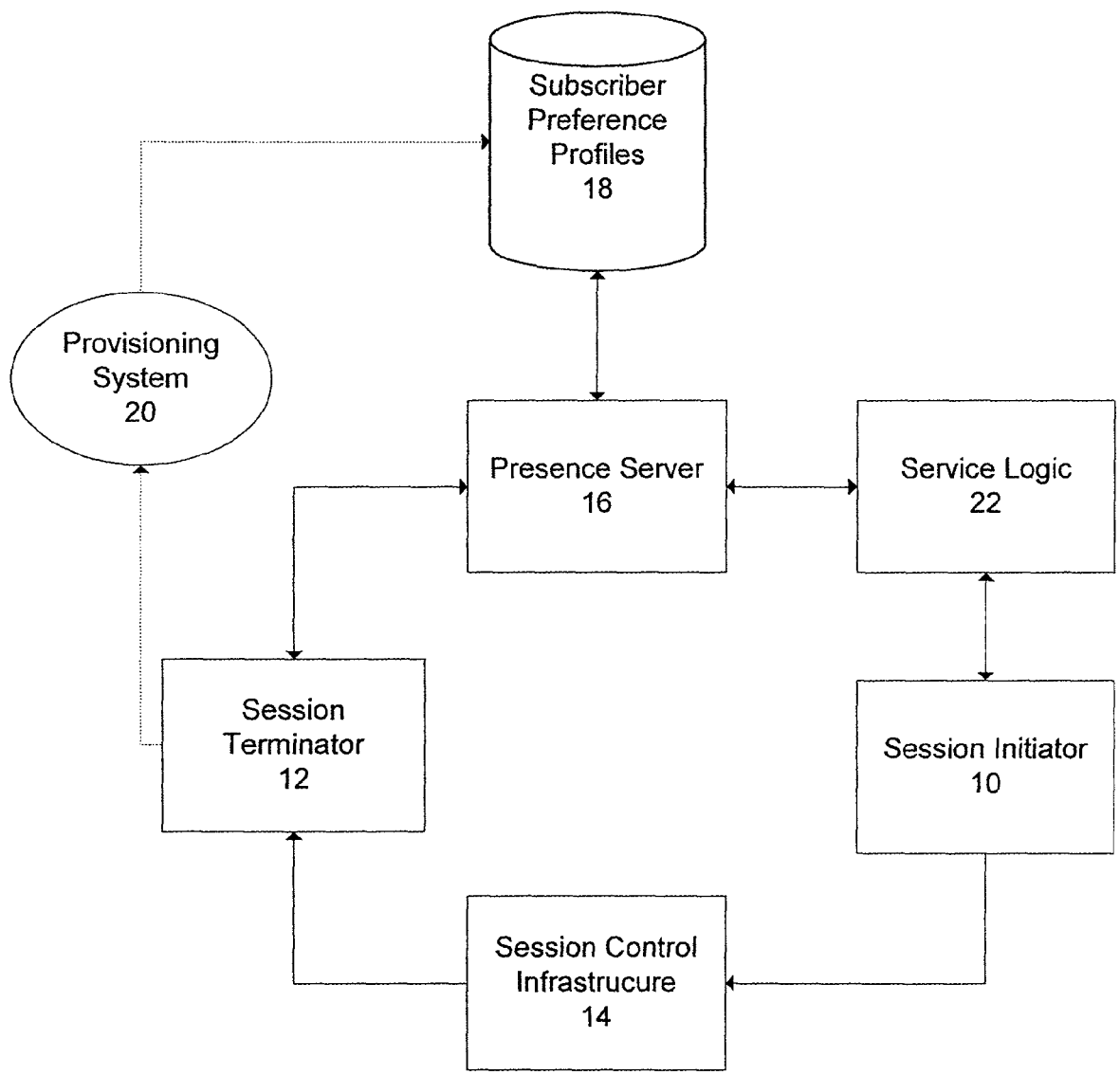
FIG. 1 is a diagram showing an exemplary network architecture, according to an aspect of the present invention.

The present invention relates to a system and method for incorporating presence into telephony to enrich the experience of both calling and called parties. The implementation of presence in telephony will be described in three exemplary technology environments: (a) a next generation telephony environment based on SIP call control (e.g., Internet telephony or 3GPP IP multimedia subsystem (IMS)), (b) traditional PSTN, and (c) a cellular model (e.g., GSM/GPRS). Of course, the present invention is also applicable to environments other than the three environments being described.

In view of the above, the present invention through one or more of its various aspects and/or embodiments is presented to accomplish one or more objectives and advantages, such as those noted below.

According to an aspect of the present invention, a system provides a presence component in a telecommunications network in which a session to a session terminator is requested by a session initiator. The system includes a presence server that receives a request for presence information and processes the request by comparing the session initiator's identity to preferences of the session terminator. The presence server returns a preferred treatment to the session initiator so that the session is initiated based upon the preferred treatment.

The system may include service logic that receives the request from the session initiator and forwards the request to the presence server. The session initiator may include a user agent client that forwards the request to the service logic, and a call user agent client that initiates the session. Alternatively, the session initiator includes a presence user agent client that forwards the request to the presence server, and a call user agent client that initiates the session. In this case, the session initiator initiates the session by sending an INVITE message to the session terminator based upon the preferred treatment.

In one embodiment, the presence server requests additional information about the session and processes the request based upon the additional information. In another embodiment, the system also includes a session control infrastructure. The session is then initiated via the session control infrastructure.

In another embodiment, the system also includes a session initiation protocol (SIP) proxy server including service logic that receives the request from the session initiator and forwards the request to the presence server. In this case, the SIP proxy server initiates the session by sending an INVITE message to the session terminator based upon the preferred treatment. The SIP proxy server may request additional information from the session initiator and the presence server may processes the request based upon the additional information.

According to another aspect of the present invention, a system provides a presence component in a public switched telephone network. The system includes a service switching point that receives a telephone call origination from a calling party and placed to a called party. The system also includes a service control point that receives a query from the service switching point in response to the call origination. The query identifies the calling party and the called party. The system further includes a presence server that receives a request for presence information from the service control point, the request identifying the calling party and the called party. The presence server processes the request by comparing the calling party identity to preferences of the called party and returns a preferred treatment to the service control point. The service control point instructs the service switching point to establish the call when the preferred treatment indicates that the called party will accept the call.

The system may also include an intelligent peripheral that collects additional information from the calling party. In this case, the presence server processes the request based on the additional information. The intelligent peripheral may inform the calling party when the preferred treatment indicates that the called party does not accept the call. Moreover, when the preferred treatment indicates that the called party does not accept the call, the service control point does not instruct the service switching point to establish the call.

According to another aspect, a system provides a presence component in a wireless telecommunications network in which a session to a session terminator is requested by a mobile device. The system includes a presence server that receives a request for presence information and processes the request by comparing the mobile device's identity to preferences of the session terminator. The presence server returns information required to set up the call to the mobile device so that the session is initiated based upon the required information.

In one embodiment, the service logic resides in the wireless network. The service logic receives the request from the mobile device and requests preferred session parameters from the mobile device. The service logic forwards the request, including the preferred session parameters to the presence server.

The mobile device may include a user agent client that forwards the request to the service logic and prompts a user to enter the preferred session parameters. The user agent client receives the information required to set up the session from the service logic, which received the information from the presence server. The mobile device may also include a call user agent client that initiates the session based on the required information, which is received from the user agent client.

According to another aspect, a method incorporates presence into a telecommunications environment. The method includes communicating with a presence platform to obtain presence information for another telecommunications subscriber, and initiating a telecommunications session with the other subscriber in response to the obtained presence information.

The method may also include forwarding preferred session parameters to the presence platform; and determining the presence information based on the preferred session parameters.

In one embodiment, the obtained presence information includes instructions to forward to voice mail, and the initiating includes connecting to the voice mail. In another embodiment, the obtained presence information indicates that the session terminator is unavailable or busy, and the initiating actually does not initiate the session but rather informs the session initiator that the session request was rejected. The preferred session parameters may include session type, urgency, and subject.

The various aspects and embodiments of the present invention are described in detail below.

The present invention enables devices within a telephony network to process presence information. Referring to FIG. 1, a session initiator 10 initiates a session with a session terminator 12, via a session control infrastructure 14. The session initiator 10 is a subscriber to a presence enhanced telephony service that attempts to initiate a communications session with one or more other subscribers. Subscribers may have the capability to act both as a session initiator 10 and a session terminator 12. From a presence perspective, the session initiator acts as a watcher. The session terminator 12 is a target of a session initiation attempt: the party or one of the parties that the session initiator 10 is attempting to contact. From a presence perspective, the session terminator 12 acts as a presentity.

The session control infrastructure 14 includes a telephone network that sets up and tears down telecommunications sessions. The data and communications transport network 14 also provides connectivity between the subscribers (session initiators 10, session terminators 12, other watchers and presentities) and service platforms. Service platforms include a presence server 16 that collects, manages, and distributes presence information, session control infrastructure 12, and auxiliary platforms (databases 18, provisioning systems 20, etc.).

The service architecture of the present invention is network and service technology agnostic. As noted above, reference protocols are merely provided as non-limiting examples.

The presence server 16 is associated with a presence service to which customers may subscribe. The subscription includes the establishment of an identity (e.g., login and password), device registration (possibly done dynamically at a future time), filling out a preference profile (possibly done dynamically at a future time), etc. By 'dynamically at a future time' it is meant that the user may actively enter preference information in the future or that the system passively collects usage based information on the user and deduces preferences.

At any time a subscriber may register with the presence server 16. The registration process provides the presence system with user availability information such as what network the user is connected to, the network capabilities, device capabilities, etc. Because the user logs in with device agnostic credentials, the device could be a PDA, cell phone, desktop computer, or other device. The presence server 16 can store static subscriber preferences in a database 18 and can also retrieve the preferences from the database 18 in response to receiving a request from a session initiator 10. Communications between the database 18 and the presence server 16 are in accordance with XML, in one embodiment of the present invention.

A subscriber 10 that wishes to establish a session with another subscriber 12 sends a query to the presence server 16 via service logic 22, which acts as a proxy towards the presence server 16. The service logic 22 may be embedded in the device 10, 12, thus allowing the device to interact directly with the presence server 16. The service logic 22 may alternatively reside in middleware in a network on a server, e.g., a web server.

Although not shown in FIG. 1, the session control infrastructure 14 and presence server 16 can communicate via a pair of optional entities: a network specific presence API (associated with the session control infrastrucure 14) and an application gateway (associated with the presence server 16). This is a generalization of the OSA Parlay architecture in which application servers may access network specific presence information using technology agnostic APIs by interfacing through an application gateway (such as the OSA gateway). In this case the presence server 16 launches a network technology agnostic query that is mapped to a network technology specific query in the gateway. The session control infrastructure 14 may "understand" only queries in protocols that are technology specific. The application gateway performs additional authorization functions so that only authorized application servers may obtain information from the network. As an example, consider a cellular network that has internal capabilities for locating mobile devices (as required for emergency 911). An authorized presence server 16 may query the network for the location of a session terminator 12 in the cellular network as part of the procedure to determine what the appropriate session termination parameters should be.

Figure 2:
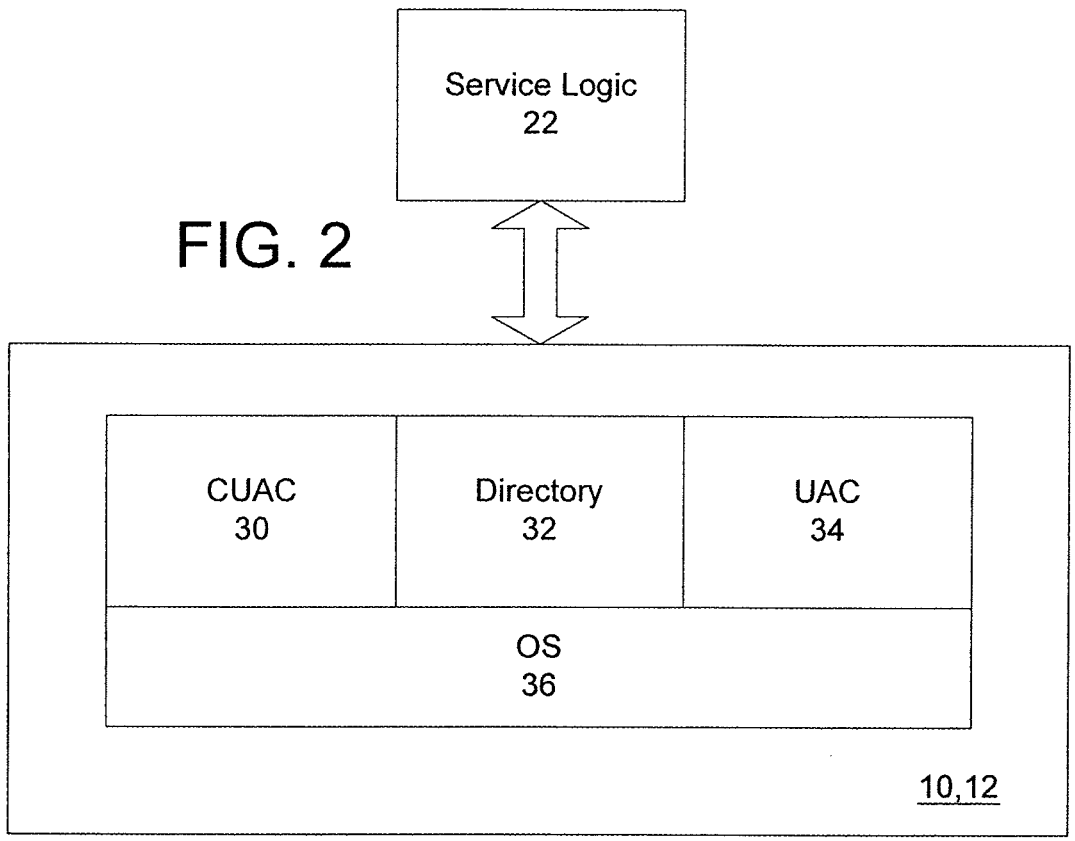
FIG. 2 is a diagram showing a client device, according to one embodiment of the present invention.
Figure 3:
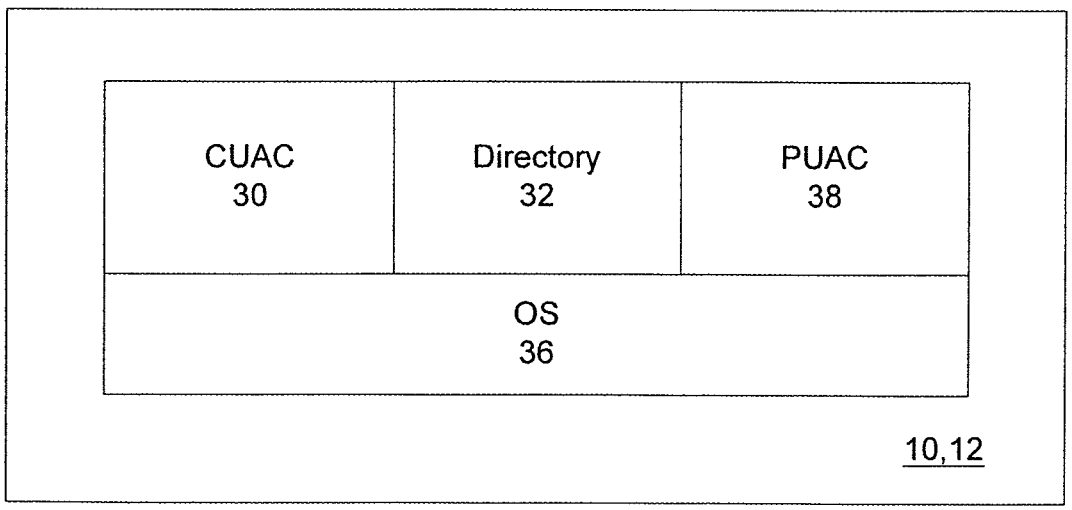
FIG. 3 is a diagram showing a client device, according to another embodiment of the present invention.

Referring to FIGS. 2 and 3, a description of the client devices, e.g., the session initiator 10 and session terminator 12, will be provided. The client devices contain software agents that allow them to communicate with the service platforms, e.g., the presence server 16, and to set up a communications session. A caller user agent client (CUAC) 30, a directory, and either a user agent client (34) or a presence user agent client (PUAC) 38 are provided. These entities communicate with each other via an operating system 36.

The call user agent client (CUAC) 30 communicates with the session control infrastructure 14. Note that the call user agent client 30 may communicate using a variety of well known technologies and protocols (e.g., SIP, various cellular wireless protocols, H.323, MGCP, etc.) More specifically, the call user agent 30 initiates and terminates sessions, in a known manner. The call user agent 30 may be embodied as software in the session initiator 10 and the session terminator 12.

A presence user agent client (PUAC) 38 communicates with the presence server 16. The presence user agent client 38 may also be located within the subscriber's communications equipment 10, 12 and is responsible for communicating with the presence server 16 for the purpose of (a) notifying the server 16 of changes in the client's status in accordance with the role of a presentity (either by posting new information or by responding to a query) or (b) obtaining presence information for another subscriber in accordance with the role of a watcher. In the special case when the user agent in the client device 10 communicates with the presence server 16 through an intermediary application, i.e., the service logic entity 22, the user agent will be referred to as a user agent client (UAC) 34. In this case, the service logic 22 provides a portion of the functionality described below.

Either the presence user agent client 38, or the service logic 22 on behalf of the user agent client 34, provides the session initiator credentials and requested session attributes to the presence server 16. The presence server 16 then checks to see: whether this request can be met, whether the session terminator (the callee) 12 is willing to engage in this session, and what the session parameters should be. Note that this approach gives complete privacy and control to the called party 12. The session terminator 12 does not even need to give out his phone number—just his presence identity. Moreover, unless the session terminator 12 gives explicit permission, knowing the presence identity does not give a hostile or an unwanted party any information about the session terminator 12. In fact, the session terminator 12 can even refuse to give access to voicemail (which may be beneficial in response to telemarketers).

A provisioning system 20 may also be provided. The provisioning system 20 is the entity by which subscriber information and preferences are collected, stored, and managed within the system. Subscriber information may include username/password, preferences, a list of services (e.g., telephony, email, messaging, etc.), privacy requirements, etc. Some of the information is provisioned prior to a subscriber using the enhanced telephony service. Other information may be collected dynamically.

In one embodiment, a directory 32 is provided. The directory 32 may reside in a terminal device 10, 12 (as shown if FIGS. 2 and 3) or in the network. The directory 32 contains a list of names from which the session initiator 10 may select the desired terminating party 12. In the directory 32, each name is mapped to an E.164 number for the purpose of initiating a telecommunications session.

The present system may be compatible with ENUM. ENUM assumes that subscribers are identified by a single E.164 number, and that one or more domain names and presence server information are obtained by performing successive mappings (text string to data) using name authority pointer (NAPTR) records in an ENUM database. It is assumed that subscribers are uniquely identified within a system (e.g., a private system under the administration of a single telephone service operator) using their 'primary E.164 number'. The primary number is defined as the public or visible number associated with a user. This number is the telephone number that the subscriber remembers and provides to others who may wish to communicate with him. This number would also be the published number (business cards, phone directories, etc.) The call initiator that wishes to contact the call terminator uses the E.164 number. He may do so by dialing the number using a keypad or by selecting it from the names directory 32 that maps the name to the primary E.164 number. If the PUAC/software logic 38 does not know the presence server network address for this particular user, it may query an ENUM server using the E.164 number. Similarly, the presence server 16 may query the ENUM server for alternate addresses. Note that a security scheme may restrict who has access to the NAPTR records, so that only a trusted entity (such as the subscriber's presence server 16 or SIP registrar) has access to this information.

Figure 4:
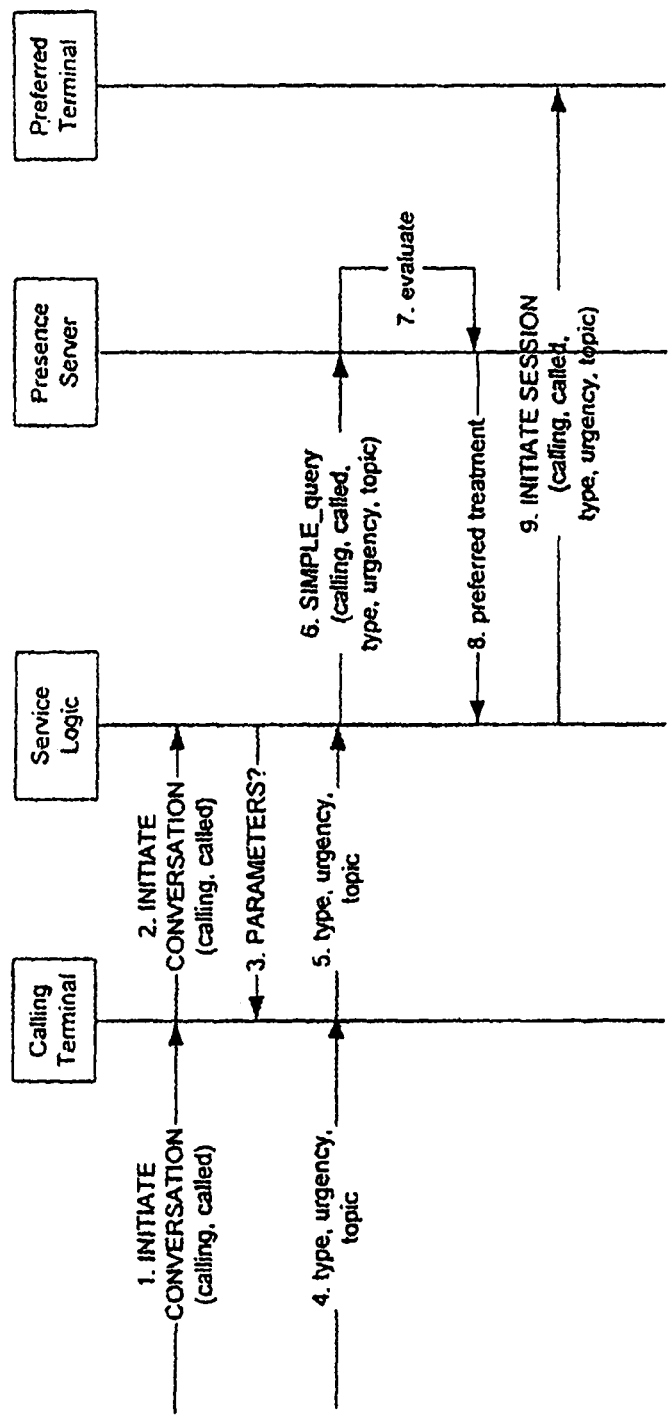
FIG. 4 is a call flow diagram showing a generic implementation of the present invention, according to one aspect of the present invention.

A generic description of an implementation of the presence service is now provided with reference to FIG. 4. The following description makes no assumptions as to the underlying network (e.g., PSTN, public land mobile network (PLMN), voice over IP (VoIP), etc.) of either the calling or the called party.

Initially, at step S1 the session initiator 10 initiates a conversation on a user interface of the terminal. This initiation could be as simple as dialing a phone number or it could involve interaction with a considerably more sophisticated graphical user interface. In a typical cell phone or computing platform the user may scroll through a directory of names, and initiate a session by pressing on a soft key, menu option, voice command, or other user interface method.

At S2, the service logic 22 in either the network or the device (i.e., the PUAC 38) receives the conversation request. When implemented in the network, the service logic 22 acts as a proxy to the user agent client 34. When implemented in the client device 10, the service logic 22 becomes part of the client 10. Network based implementations have the advantage of working uniformly across a wide array of device capabilities.

At S3, the service logic 22 requests additional information about the call from the calling party 10. At step S4, the calling party 10 provides any additional requested information, such as subject, urgency, requested session type (e.g., voice call, message). This information may be obtained by prompting the person or by using statically provisioned information. At S5, the requested session parameters are passed on by the user agent client 34 to the service logic 22. Alternatively, if a presence user agent client 38 is provided, step S5 is omitted. Steps S3, S4, and S5 are optional because, in the simplest case, the service logic 22 could use only the calling and called party identities to determine how to handle the call.

At step S6, the service logic 22 (or presence user agent client 38) sends a query to the presence server 16. The most obvious means of doing this would be to use the IETF SIMPLE protocol. The SIMPLE protocol is an extension of the SIP protocol for presence and instant messaging that describes the caller identity, called party identity, and any other information needed to make a decision about the disposition of the call. Although not shown in FIG. 4, if the client 22 (or 38) does not know the presence uniform resource identifier (URI) (i.e., the host name of the appropriate presence server 16), the service logic 22 may query an ENUM server to obtain the presence URI based on the E.164 number, and subsequently query a DNS server for the actual IP address of the presence server 16.

At step S7, the presence server 16 (or an application associated with the presence server 16) processes the request by comparing the proposed call parameters and the calling party's identity to known preferences of the called party 12. Is the called party available and willing to participate in a conversation with the calling party? Are the device or devices with which the called party is registered on the network able to support the requested conversation parameters? Presence information for the called party 12 can be based on a static profile filled out earlier, or the called party 12 can be prompted dynamically to determine availability and willingness.

At step S8, the presence server 16 (or an application associated with it) responds to the service logic 22 (or PUAC 38) with the preferred treatment, e.g., send to voicemail, connect to a given phone number, reject session, etc. Based on the received information, at step S9 the CUAC 30 initiates a session with the preferred terminal. On the other hand, if the session is rejected, the service logic 22 (or PUAC 38), simply informs the calling terminal 10 of the rejection.

Figure 5:
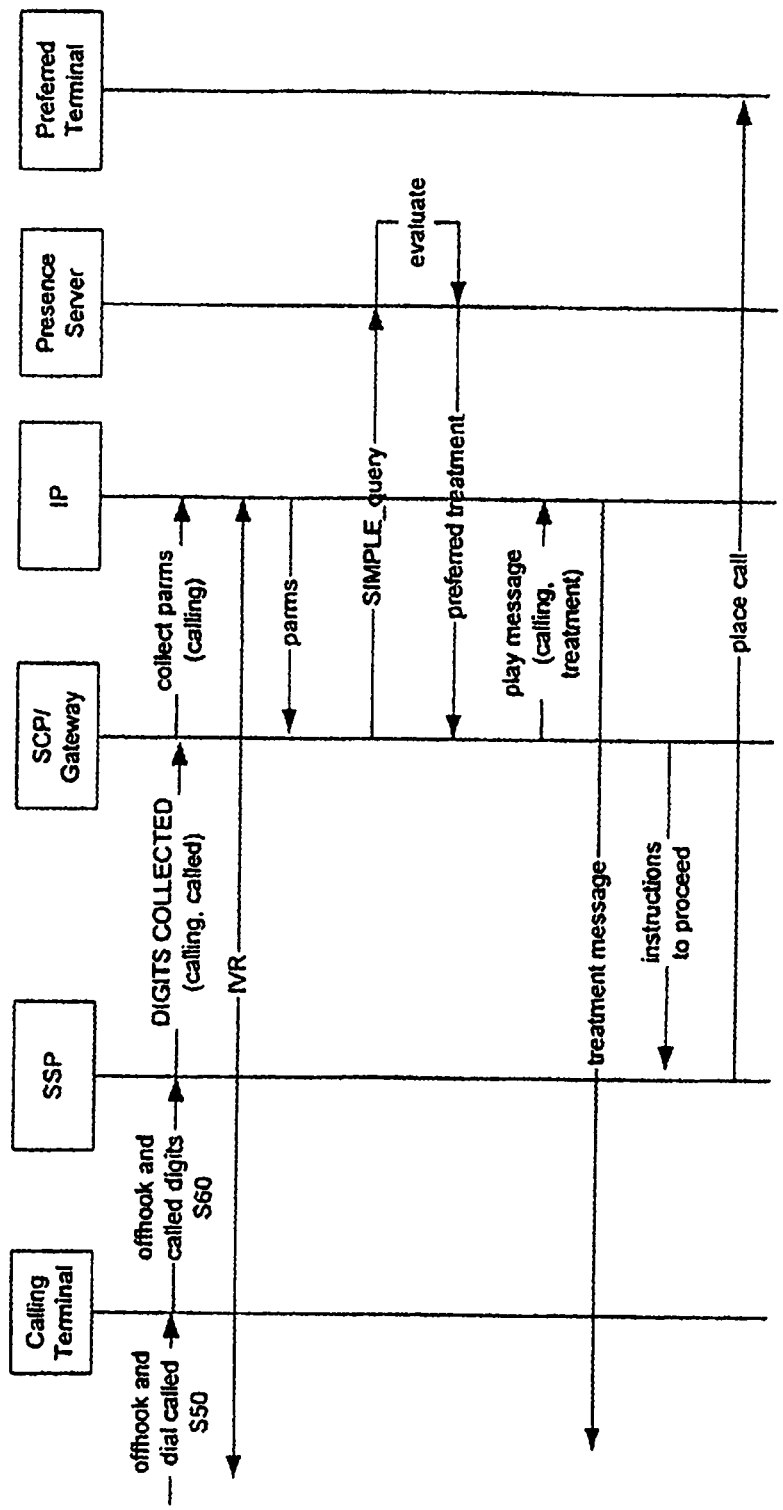
FIG. 5 is a call flow diagram showing a public switched telephone network implementation, according to an aspect of the present invention.

An example of the present invention implemented in a public switched telephone network (PSTN) will now be described with respect to FIG. 5. In the PSTN, this service could be implemented with Intelligent Network (IN) technology. The conversation request would be received as a regular call origination at a central office switch 50 containing service switching point (SSP) software (at step S50). That software would see the dialed digits at step S52, and send a DIGITS COLLECTED trigger message to a service control point (SCP) 52 in the network, at step S54. This message would identify the calling party 10 and called party 12. The SCP 52 would execute a program of its own to determine the called party's presence preferences and handle the call accordingly.

In the simple session terminator case, the SCP 52 would query a presence server (at step S60), supplying it with calling and called party information, and receiving instructions on how to proceed. In a more sophisticated version of the service, the SCP 52 would employ the services of an Intelligent Peripheral (IP) 54 to engage in an interactive voice response (IVR) conversation with the calling party in order to learn more about the call, such as topic and urgency (step S57). The IP 54 might also be invoked to inform the calling party 10 of call dispositions when the called party 12 is unable or unwilling to take the call.

While traditionally the intelligent network has only limited means for interacting with Internet-based platforms such as a presence server 16 (e.g., the Telcordia GDI technology), more flexible options are now available based on the Parlay/OSA and JAIN interfaces being standardized within the Parlay Group, 3GPP, ETSI, and Java Community Process. Any of these interfaces could be provided between the SCP 52, presence server 16, and any other Internet-based platforms. It is possible that the SCP 52 alone could provide the gateway functionality needed to query a presence server 16, e.g., if the presence server 16 were implemented as a GDI server. In another embodiment, the SCP 52 (which resides in the PSTN) interfaces with a separate Parlay/OSA gateway (which sits on the border between the PSTN and the Internet). Logic on the gateway would make the actual query to the presence server 16 and relay the results back to the SCP 52.

After the SCP 52 sends the query to the server 16, at step S7, the presence server 16 (or an application associated with the presence server 16) processes the request by comparing the proposed call parameters and the calling party's identity to known preferences of the called party 12, as discussed above. At step S8, the presence server 16 (or an application associated with it) responds to the SCP 52 with the preferred treatment, e.g., send to voicemail, connect to a given phone number, reject session, etc. Based on the received information, at step S62 the SCP 52 instructs the IP 54 to play a message informing the calling party 10 of the preferred treatment. The IP plays the message at S64, and at S66 the SCP 52 instructs the switch 50 to route the call according to the preferred treatment. At step S68, the switch 50 places the call in response to the SCP's instructions.

Figure 6:
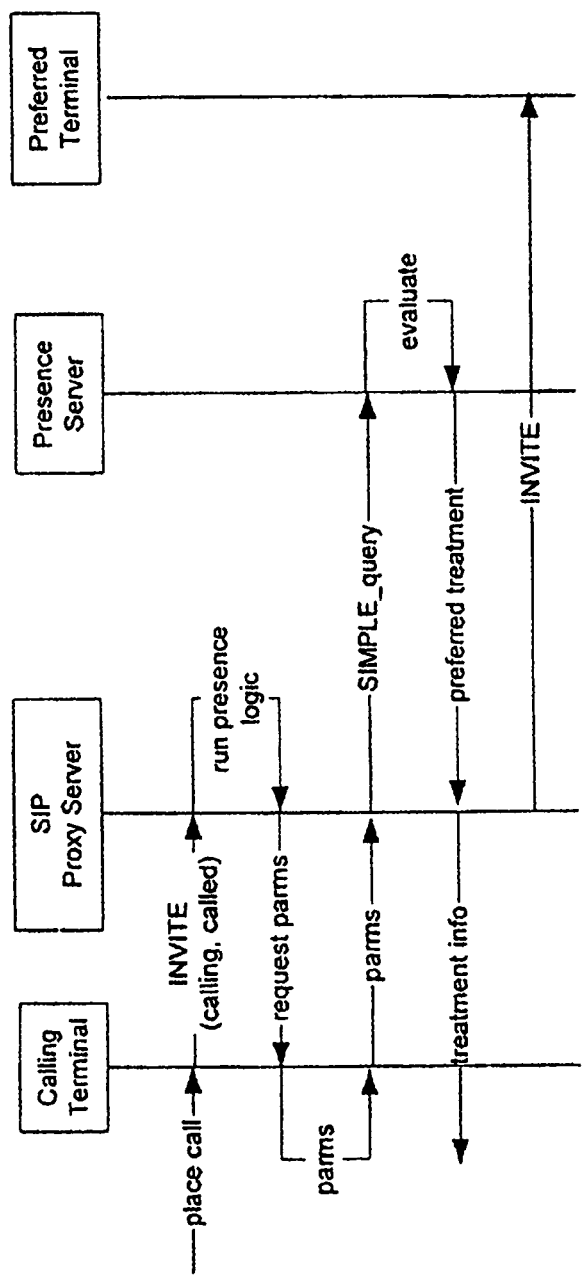
FIG. 6 is a call flow diagram for a session initiation protocol (SIP) implementation, according to an aspect of the present invention.
Figure 7:
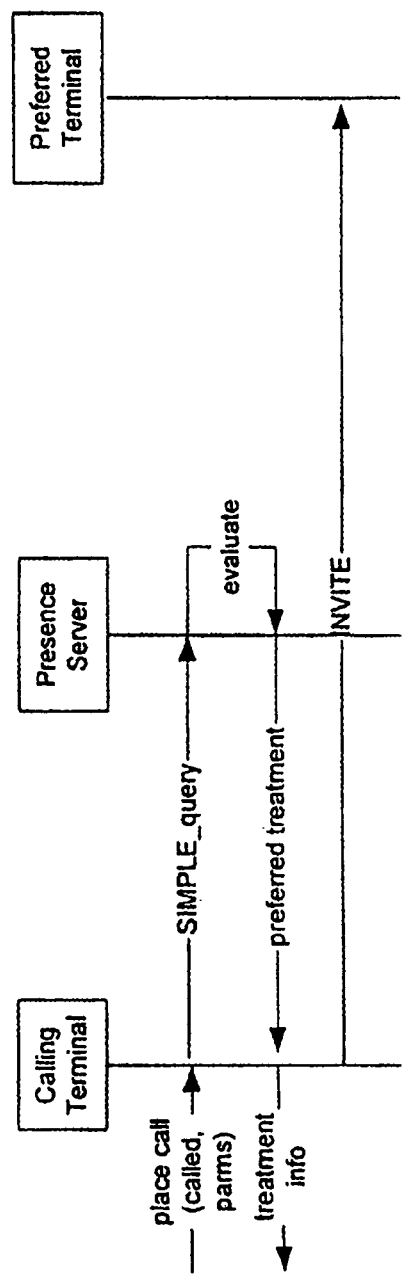
FIG. 7 is a call flow diagram for an alternate session initiation protocol (SIP) implementation, according to an aspect of the present invention.

A SIP implementation is now described with reference to FIGS. 6 and 7. A PSTN implementation, while feasible, is limited by what its terminals—simple 12-button phones—can do. A richer user experience can be offered on a terminal with more sophisticated capabilities, e.g., a PC or a PDA. In this environment, the SIP protocol, plus standardized extensions, offers a better way of implementing the service. The flexibility of this protocol and the intelligence available in the terminals permits the service logic to reside almost entirely in those terminals, or it could reside in the network (e.g., on a SIP proxy server), or a combination of the two. The code would be virtually identical in either case. FIG. 6 shows a high level view with service logic in the proxy server. FIG. 7 shows an alternate embodiment.

Referring to FIG. 6, initially, at step S1 the session initiator 10 initiates a conversation on a user interface of their terminal. The service logic 22 in the device receives the conversation request and at S60 sends an INVITE message to a SIP proxy server 60, which runs the client presence logic. That is, the presence user agent client 38 is located at the SIP proxy server 60. The presence user agent client 38 communicates with a UAC 34 and a SIP proxy server 60 to share presence information. For example, the presence user agent client 38 may provide the UAC 34 with presence information that the call user agent 30, based on the SIP protocol, uses to determine session initiation parameters.

At S3, the SIP proxy server 60 requests additional information about the call from the calling party 10. At step S4, the calling party 10 provides any additional requested information, such as subject, urgency, and requested session type. The parameters may be obtained by prompting the person or by using statically provisioned information. At S5, the requested session parameters are passed on by the calling terminal 10 to the SIP proxy server 60. At step S6, the SIP proxy server 60 sends a query to the presence server 16. Steps S3, S4, and S5 are optional because the service logic 22 could use only the calling and called party identities to determine how to handle the call.

At step S7, the presence server 16 (or an application associated with the presence server 16) processes the request by comparing the proposed call parameters and the calling party's identity to known preferences of the called party 12. At step S8, the presence server 16 (or an application associated with it) responds to the SIP proxy server 60 with the preferred treatment, e.g., send to voicemail, connect to a given phone number, reject session, etc. Based on the received information, at step S9 the SIP proxy server 60 sends an INVITE message to the preferred terminal. If the session is rejected, however, the SIP proxy server 60 informs the calling terminal 10 of the rejection.

An alternate embodiment is now described with respect to FIG. 7. In this embodiment, the calling terminal 10 communicates directly with the presence server 16 to determine the preferred treatment. That is, a SIP proxy server 60 is not employed. Further; the presence user agent client functionality 38 is provided in the calling terminal 10. At step S70 the calling terminal places the call using any desired calling parameters. At step S6, a SIMPLE query is sent to the presence server 16, which evaluates the query at S7 and returns the preferred treatment to the caller 10 at Step S8. At step S9, the calling terminal 10 initiates a session by sending an INVITE message to the called terminal 12. More specifically, a SIP user agent, which is a special type of call user agent 30 that communicates via the SIP protocol and is located within the subscriber's communications equipment, communicates with the network 14 (e.g., SIP proxy server, register, server, etc.) to set up a communications session.

Figure 8:
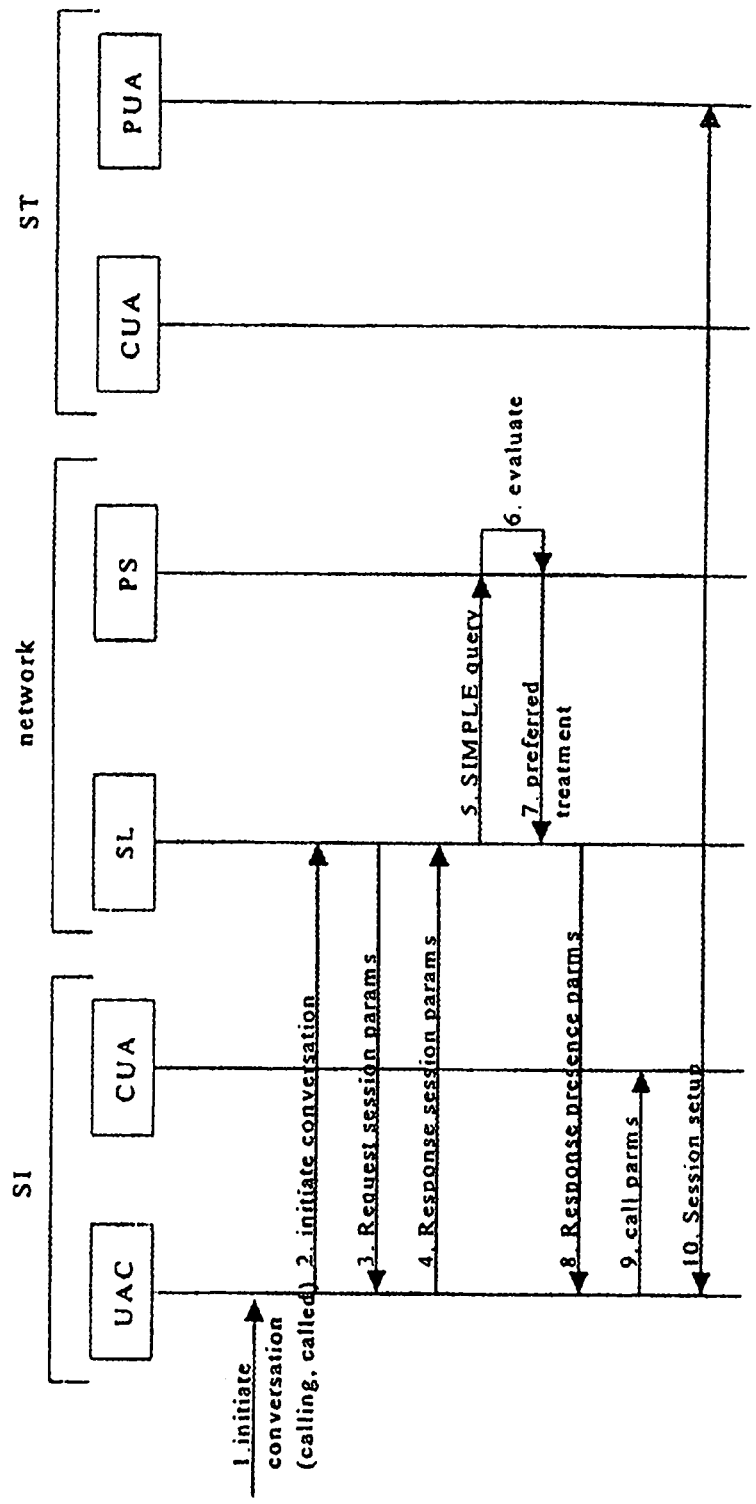
FIG. 8 is a call flow diagram for a wireless network implementation, according to an aspect of the present invention.

An embodiment of the present invention in a wireless network will now be described with reference to FIG. 8. The wireless embodiment is capable of operating in both 2.5G and 3G networks such as GSM/GPRS, 1XRTT, and UMTS. In this embodiment, the UAC 34 on the mobile device may be a Java plug-in or part of the phone's embedded operating system. The UAC 34 interacts with the presence enhanced telephony application service logic 22 via HTTP(S) (secure HTTP) over a data connection such as GPRS. The call user agent client 30 communicates with the network call control infrastructure 14 using well known standard procedures. For example, in a SIP environment (such as, universal mobile telephone service (UMTS) and IP multimedia subsystem (IMS)) the call user agent client 30 communicates with a serving call session control function S-CSCF (i.e., a SIP server) in the IMS and/or with other external SIP proxies.

As in the other embodiments, initially at step S1 the session initiator 10 attempts to initiate a conversation with the session terminator 12. The session initiator 10 may do so by scrolling through a names directory in the phone or using the phone key pad to enter the session terminator URI (or other unique identifier). At step S2 the UAC 34 initiates a request to the service logic 22. This request may be carried using HTTP(S) over an 'always on' data connection between the mobile device 10 and the network in which the service logic 22 resides. Alternatively, the service logic 22 may reside in the mobile terminal 10 so that the request occurs internally.

At step S3, the service logic 22 responds to the UAC 34 with a request for preferred session parameters. The UAC 34 may respond to this query by prompting the user to enter information (e.g., session type, subject, urgency) or by using default (statically configured) information. At step S5 the information is sent to the service logic 22. Using the information from the UAC 34, at step S6 the service logic 22 formulates a SIMPLE request to the presence server 16.

At step S7 the presence server 16 evaluates the requested session parameters and session initiator identity, and compares the parameters and identity to known preferences of the session terminator 12. Based on this evaluation at step S8 the presence server 16 responds to the service logic 22 and then the service logic 22 sends the UAC 34 the information required to set up the session in accordance with the preferences of the session terminator 12.

At step S80, the UAC 34 provides the calling information to the call user agent client 30 in the phone. That is, information necessary to set up a session is provided, e.g., the IP address, E.164 number, MS-ISDN, domain name requiring further DNS translation, etc. Finally, at step S9 the call user agent client 30 initiates a session. In the event that an error message, a session denied message, a user unavailable message or a user busy message is returned at step S8, step S9 is omitted.

Thus, the present invention enables presence information to be provided in the telephone network. Although three examples have been provided, the present invention is not limited to the three network environments discussed. It is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission and public telephone networks represent examples of the state of the art. Such standards are periodically superseded by faster or more efficient equivalents having essentially the same functions. Accordingly, replacement standards and protocols having the same functions are considered equivalents.

What is claimed is:

1. A method for integrating presence services into a telecommunications system that includes a presence server, the method comprising:

receiving a query, by the presence server from service logic, the query including call parameters and call information, regarding a call from a session initiator to a session terminator;

comparing, by the presence server, the call parameters and the call information with a stored presence profile established for the session terminator, the stored presence profile including preferred treatment information;

collecting usage information of the session terminator, and automatically generating preferred treatment information for the session initiator based on prior usage information of the session terminator in response to at least one prior call from the session initiator, when the preferred treatment information has not been established by the session terminator; and determining a treatment of the call, by the presence server, based upon the stored presence profile and the preferred treatment information.

2. The method of claim 1, wherein the service logic is embedded in the session initiator.

3. The method of claim 1, wherein the service logic resides in middleware on a web server in the telecommunications system.

4. The method of claim 1, wherein the session terminator is associated with a subscriber to presence services provided by the presence server.

5. The method of claim 1, wherein the call information includes a subject and an urgency.

6. The method of claim 5, wherein the treatment of the call includes accepting the call, rejecting the call, directing the call to a voicemail service, and deferring the call so that further call information is obtained from the caller.

7. The method of claim 4, wherein the subscriber to the presence services establishes the stored presence profile, which includes an identity, a password, and a registration, and also establishes the preferred treatment information.

8. The method of claim 7, wherein the presence server stores the stored presence profile in a database.

9. The method of claim 8, wherein the session terminator is at least one of a cell phone, a PDA, a desktop computer, and a land-line telephone.

10. The method of claim 7, wherein the registration includes subscribing to at least one service, including telephony, email, and messaging services.

11. A tangible storage medium encoded with an executable computer program, the medium comprising:

a receiving segment for receiving a query, by the presence server from service logic, the query including call parameters and call information, regarding a call from a session initiator to a session terminator;

a comparing segment for comparing, by the presence server, the call parameters and the call information with a stored presence profile established for the session terminator, the stored presence profile including preferred treatment information;

a collecting segment for collecting usage information of the session terminator, and for automatically generating preferred treatment information for the session initiator based on prior usage information of the session terminator in response to at least one prior call from the session initiator, when the preferred treatment information has not been established by the session terminator; and a determining segment for determining a treatment of the call, by the presence server, based upon the stored presence profile and the preferred treatment information.

12. The medium of claim 11, wherein the session terminator is associated with a subscriber to presence services provided by the presence server.

13. The medium of claim 11, wherein the call information includes a subject and an urgency.

14. The medium of claim 13, wherein the treatment of the call includes accepting the call, rejecting the call, directing the call to a voicemail service, and deferring the call so that further call information is obtained from the caller.

15. The medium of claim 12, wherein the subscriber to the presence services establishes the stored presence profile, which includes an identity, a password, and a registration, and also establishes the preferred treatment information.

16. The medium of claim 15, wherein the presence server stores the stored presence profile in a database.

17. The medium of claim 16, wherein the session terminator is at least one of a cell phone, a PDA, a desktop computer, and a land-line telephone.

18. The medium of claim 15, wherein the registration includes subscribing to at least one service, including telephony, email, and messaging services.

19. A presence server that provides presence services in a telecommunications system, the presence server comprising:

a service logic interface for receiving a query, from service logic, including call parameters and call information regarding a call from a session initiator to a session terminator;

a processor for comparing the received call parameters and call information with a stored presence profile established for the session terminator, the stored presence profile including preferred treatment information; and a storage for storing the presence profile, including the preferred treatment information, wherein the presence server collects usage information of the session terminator, and automatically generates preferred treatment information for the session initiator based on prior usage information of the session terminator in response to at least one prior call from the session initiator when the preferred information treatment information has not been established by the session terminator, and wherein the presence server determines the treatment of the call based upon the stored presence profile and the preferred treatment information.

20. The presence server of claim 19, further comprising:

a session terminator interface, which is used to establish the stored presence profile, including a subscriber identity, password, and registration, and to establish the preferred treatment information.

* * * * *